Oct. 19, 1954   S. RUBEN   2,692,215
ALKALINE DRY CELL
Filed June 14, 1952
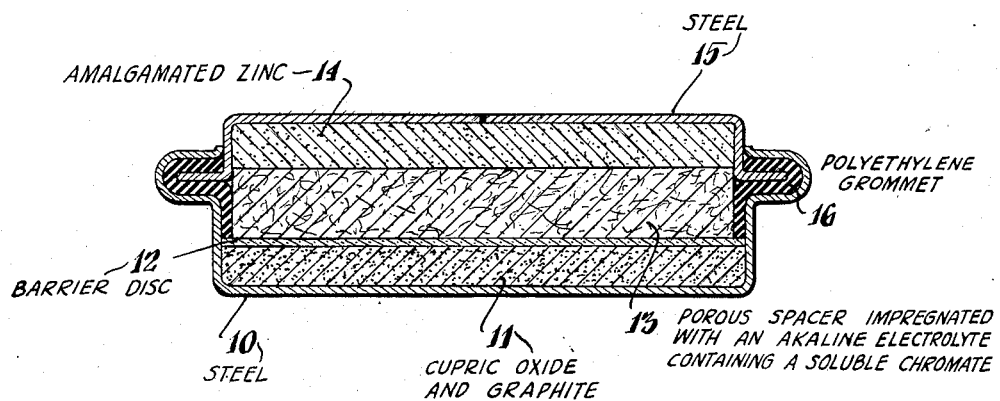
INVENTOR
Samuel Ruben
BY
ATTORNEY Patented Oct. 19, 1954

2,692,215

UNITED STATES PATENT OFFICE 2,692,215

ALKALINE DRY CELL

Samuel Ruben, New Rochelle, N. Y.

Application June 14, 1952, Serial No. 293,540

11 Claims. (Cl. 136—137)

This invention relates to alkaline dry cells and particularly to alkaline primary dry cells employing a depolarizer of copper oxide.

An object of the invention is to provide an improved low cost primary dry cell.

A further object of the invention is the provision of an alkaline primary dry cell utilizing a cathode depolarizer of copper oxide and an electrolyte which provides long cell storage life.

Another object of the invention is to provide an alkaline primary dry cell suitable for use as a hearing aid battery and which can be produced at a much lower cost than mercuric oxide alkaline dry cells now used in hearing aids and similar devices.

Still another object of the invention is the provision of a new method for making and assembling anode elements for electric current producing cells.

Other objects of the invention will be apparent from the disclosure and from the accompanying drawing in which is shown a sectional view of a cell embodying features of the invention.

The use of a copper oxide, such as cupric oxide, as a depolarizer in primary cells is well known and is embodied in commercial cells, such as the Edison Leland cell.

One of the limitations on the use of a cupric oxide alkaline cell has been the poor shelf life of the cell on open circuit. Essentially, presently commercially available cells consist of a pressed and sintered mass of cupric oxide, an alkaline electrolyte, such as sodium or potassium hydroxide, and a zinc or amalgamated zinc anode. On standing, a small amount of the cupric oxide combines with the alkaline electrolyte to form a cupric alkaline salt complex, which in turn is reduced by the zinc, which forms a galvanic couple and causes self discharge of the zinc anode or polarization of its effective surface.

I have found that the addition to the electrolyte of a soluble chromate, such as a chromate or bichromate of sodium, potassium, magnesium or lithium, will prevent the deposition of copper or copper compounds on the zinc. The effect of this addition is easily and quickly demonstrated. For example, if a piece of zinc is immersed in an ammonium hydroxide solution containing dissolved cupric oxide, it will, in a short time, be completely covered with copper and a copper compound; whereas, if ammonium chromate, preferably in saturation quantities, is added to the solution, the zinc remains bright and clear and free of copper or cupric compounds on its surface. Where potassium or sodium solutions are used, a similar but slower reaction takes place.

This has a specific value in dry cells of the type described in my prior Patent No. 2,422,045. In a cell described in that patent, there is employed a depolarizer of cupric oxide mixed with graphite, consolidated into a steel container, a zinc amalgam anode separated from the depolarizer by a barrier disc and an absorbent paper spacer, and an electrolyte held in the barrier and spacer, comprising potassium hydroxide containing adequate dissolved zincate to limit dissolution of the anode.

In the present invention, I add to the electrolyte (which is preferably a solution formed from 100 grams of potassium hydroxide, 16 grams of zinc oxide and 100 grams of water) the maximum amount of potassium bichromate soluble in the electrolyte. If sodium hydroxide is used, the chromate is preferably sodium chromate or bichromate. As the solubility of the chromates for these strong alkalis is very low, saturation does not introduce a control problem.

While cupric oxide is the preferred copper depolarizer compound, other copper compounds, such as, cupric hydroxide or cuprous oxide, can be used. In order to provide the maximum conductivity to the cathode, micronized graphite to the extent of 10% by weight is added and mixed in with the cupric oxide.

In the cell illustrated in the drawing, the steel container 10, the inside surface of which may have been sprayed with a graphite coating, houses the depolarizer 11, which consists of a pellet formed of a mixture of 90% cupric oxide and 10% graphite, the pellet being consolidated into the container at a pressure of about 20,000 pounds per square inch so that a unitary assembly is obtained. Over the depolarizer is a barrier disc 12 to prevent migration of fine sized graphite or other filterable materials to the anode. The barrier may be comprised of finely porous glass or glass fibre, fibrous styrene, ceramics, parchmentized paper or other suitable material. The spacer of cotton fibre paper 13, such as Webril, rests upon the barrier and is in contact with amalgamated zinc anode 14 which is housed in tinned steel top 15. The electrolyte, which is the preferred type previously described, is held within the barrier 12 and the spacer 13.

The anode 14, is made by first producing a zinc member which may be in the form of disc or cup or other suitable shape and amalgamating this member with a 15% mercury compound by immersion in a 60° C. solution of ammonium chloride and mercuric chloride. The zinc rapidly extracts the mercury from the solution and becomes very brittle. The amalgamated zinc member, which I prefer to have in cup or domed shape, is pressed in the tinned steel container and is crushed into place by suitable means to provide a porous finely divided zinc amalgam disc of large area in consolidated contact with the wall of the steel container.

Insulation of top member 15 from container 10 is effected by polyethylene grommet 16. An airtight closure for the cell is provided by crimping container 10 against the grommet as shown in the drawing.

The cell may be electrochemically balanced in respect to the amount of zinc and available oxygen content of the depolarizer, or a slight excess of depolarizer may be used. If desirable, venting means may be provided as shown in my prior alkaline cell patents to discharge any gas that may be generated if complete balance of zinc and depolarizer is not obtained, or to avoid the effects of any impurities.

In order to insure the maintenance of an adequate chromate supply in the electrolyte, it is desirable to add about 0.1% by weight of dry potassium bichromate crystals to the cupric oxide-graphite mixture.

For some applications, it is possible to simplify the structure and manufacture of the cell by combining the barrier, spacer and electrolyte in one member. This may be accomplished by the use of a suitable porous spacer impregnated with a polyvinyl alcohol gelatinized potassium hydroxide solution. This material may be made as follows: Dexter Victory paper is passed slowly through an alkaline polyvinyl alcohol solution, the solution being made by heating 10 grams of Dupont Evanol to 80° C. with 100 cc. of water, the solution being continuously agitated by a stirrer. When completely dissolved, 16 cc. of 50% potassium hydroxide is added with continuous stirring. After the paper is passed through this solution and through rollers to provide a smooth surface, it is passed through the electrolyte solution made from 100 grams of potassium hydroxide, 16 grams of zinc oxide and 100 grams of water containing a saturation quantity of dichromate, which immediately gels the polyvinyl alcohol in the paper and on its surface. Discs punched from this material may then be used as a combination barrier, spacer and electrolyte member for assembly in cells.

The cell of my invention as described has a potential of 1.08 volts compared to a voltage for alkaline manganese oxide cells of 1.54 volts and for alkaline mercuric oxide cells of 1.34 volts. I have found that by adding to the copper oxide a relatively small percentage of either mercuric oxide or manganese oxide, in the order of 10% to 20%, that the voltage of the cell will be that of the higher oxide until such higher oxide is consumed. This is of particular advantage with mercuric oxide in which the effect of the addition of mercuric oxide to the cupric oxide-graphite mix, provides a depolarizer having special beneficial characteristics. In a preferred composition, I form the depolarizer of 70% cupric oxide, 20% mercuric oxide and 10% graphite. In addition to obtaining the full capacity of the mercuric oxide at its initial voltage of 1.34, this composition provides a more efficient use of the cupric oxide due to the fact that the finely divided mercury produced in the reduction of the mercuric oxide provides better intergrain contact of the copper oxide particles, and also tends to amalgamate with reduced copper. The composite cupric oxide-mercuric oxide-graphite mixture may also desirably include a fractional percent of a soluble chromate.

In general, I prefer to hold the proportion of mercuric oxide from 5% to 25% of the depolarizer in weight.

I claim:

1. An electric current producing cell having a depolarizer comprising an oxygen yielding copper compound, a zinc anode, and an alkaline electrolyte characterized by the addition of a soluble chromate.

2. A dry primary cell having a depolarizer comprising copper oxide, an amalgamated zinc anode, and an electrolyte comprising a hydroxide and containing a soluble chromate.

3. An alkaline dry cell having a cathode depolarizer comprising a mixture of cupric oxide and graphite, an anode of amalgamated zinc, and a potassium hydroxide electrolyte containing potassium bichromate.

4. An alkaline dry cell having a depolarizer comprising copper oxide, graphite and 5% to 25% of mercuric oxide, an alkaline electrolyte containing a soluble chromate, and an amalgamated zinc anode.

5. An alkaline dry cell having a depolarizer comprising an oxygen yielding compound of copper having admixed therewith a relatively smaller proportion of an oxide of a metal having a higher potential, a hydroxide electrolyte containing a soluble chromate, and an amalgamated zinc anode.

6. A dry primary cell having a cathode-depolarizer comprising copper oxide, an anode comprising amalgamated zinc, and an immobilized alkali metal hydroxide electrolyte containing in solution a substantial quantity of alkali metal zincate and a soluble alkali metal chromate.

7. A dry primary cell having a cathode-depolarizer consisting preponderately of cupric oxide and containing graphite and mercuric oxide admixed therewith, an amalgamated zinc anode, an ionically permeable barrier and a porous spacer interposed between said cathode-depolarizer and anode, and an electrolyte absorbed by the barrier and spacer comprising an aqueous solution of potassium hydroxide, an alkali metal zincate and potassium bichromate.

8. An air-tight primary dry cell comprising a steel container, the inside surface of which is carbon coated, a cathode-depolarizer housed in said container comprising copper oxide and manganese dioxide, an amalgamated zinc anode, and an immobilized electrolyte comprising an aqueous solution of an alkali metal hydroxide, an alkali metal zincate and an alkali metal chromate.

9. A dry primary cell having a cathode-depolarizer comprising copper oxide having admixed therewith a fractional percent of a soluble dry chromate, an anode comprising amalgamated zinc, and an immobilized alkali metal hydroxide electrolyte containing in solution a substantial quantity of alkali metal zincate and a soluble alkali metal chromate.

10. An alkaline dry cell comprising, in combination, a cathode depolarizer having its major portion composed of a mixture of cupric oxide and graphite, an anode of amalgamated zinc, and an electrolyte of an alkali metal hydroxide containing a compound selected from the group consisting of chromates and bichromates of the same alkali metal.

11. An alkaline dry cell comprising, in combination, a cathode depolarizer having its major portion composed of a mixture of cupric oxide and graphite, an anode of amalgamated zinc, and an electrolyte of an alkali metal hydroxide solution saturated with a chromate compound of the same alkali metal.

References Cited in the file of this patent

UNITED STATES PATENTS

| Number | Name | Date |
|---|---|---|
| 165,452 | Leclanché | July 13, 1875 |
| 289,795 | Anderson | Dec. 11, 1883 |
| 357,642 | Tasker | Feb. 15, 1887 |
| 1,331,877 | Ruhoff | Feb. 24, 1920 |
| 1,437,470 | Kershaw | Dec. 5, 1922 |
| 1,560,379 | Darimont | Nov. 3, 1925 |
| 2,422,045 | Ruben | June 10, 1947 |
| 2,509,249 | Rhodes | May 30, 1950 |
| 2,536,699 | Ruben | Jan. 2, 1951 |
| 2,542,575 | Ruben | Feb. 20, 1951 |
| 2,576,266 | Ruben | Nov. 27, 1951 |

FOREIGN PATENTS

| Number | Country | Date |
|---|---|---|
| 546,901 | France | Sept. 5, 1922 |